(12) United States Patent
Sethi et al.

(10) Patent No.: US 7,929,776 B2
(45) Date of Patent: Apr. 19, 2011

(54) METHOD AND APPARATUS FOR ERROR RECOVERY USING INTRA-SLICE RESYNCHRONIZATION POINTS

(75) Inventors: Sumeet Singh Sethi, San Diego, CA (US); Seyfullah Halit Oguz, San Diego, CA (US); Vijayalakshmi R. Raveendran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1289 days.

(21) Appl. No.: 11/373,608

(22) Filed: Mar. 9, 2006

(65) Prior Publication Data

US 2006/0233239 A1 Oct. 19, 2006

Related U.S. Application Data

(60) Provisional application No. 60/660,879, filed on Mar. 10, 2005, provisional application No. 60/713,207, filed on Aug. 30, 2005.

(51) Int. Cl.
G06K 9/36 (2006.01)
G06K 9/46 (2006.01)

(52) U.S. Cl. ........................................ 382/232; 382/239

(58) Field of Classification Search .................. 382/232, 382/239, 246, 248, 251; 375/240.27, 240.28
See application file for complete search history.

(56) References Cited

U.S. PATENT DOCUMENTS

| 6,339,658 | B1 | 1/2002 | Moccagatta et al. | |
| 6,445,742 | B1 | 9/2002 | Yoo et al. | |
| 6,665,345 | B1* | 12/2003 | Sekiguchi et al. | 375/240.25 |
| 6,701,018 | B2* | 3/2004 | Nagai et al. | 382/232 |
| 2003/0152149 | A1* | 8/2003 | Denolf | 375/240.24 |
| 2006/0039475 | A1* | 2/2006 | Liu et al. | 375/240.16 |

FOREIGN PATENT DOCUMENTS

| CL | 00857-1995 | 6/1995 |
| CL | 01760-2003 | 10/2004 |
| CL | 00806-2005 | 12/2005 |
| CL | 01047-2005 | 12/2005 |
| CL | 01655-2007 | 1/2006 |
| CL | 0543-2006 | 9/2006 |
| CL | 00539-2006 | 11/2006 |
| CL | 540-2006 | 11/2006 |
| CL | 00544-2006 | 2/2007 |
| CL | 00541-2006 | 1/2008 |
| EP | 0 861 001 A2 | 2/1998 |
| GB | 2381980 A | 5/2003 |
| KR | 20000031031 | 6/2000 |
| WO | WO 03/075577 A2 | 9/2003 |

* cited by examiner

*Primary Examiner* — Phuoc Tran
(74) *Attorney, Agent, or Firm* — Dang Vo; Gerald P. Joyce, III

(57) ABSTRACT

A method of video coding that includes encoding resynchronization point information, where the resynchronization point information includes information identifying a location of a resynchronization point within a section of a video bitstream and information for decoding the bitstream following the resynchronization point. Also, a method for decoding digital video that includes receiving an encoded bitstream including resynchronization point information, where the resynchronization point information includes information identifying a location of a resynchronization point and information for decoding the bitstream following the resynchronization point, decoding the received bitstream, and locating the resynchronization point in the bitstream based on the resynchronization point information.

48 Claims, 11 Drawing Sheets

METHOD AND APPARATUS FOR ERROR RECOVERY USING INTRA-SLICE RESYNCHRONIZATION POINTS

CLAIM OF PRIORITY UNDER 35 U.S.C. §119

The present Application for Patent claims priority to Provisional Application No. 60/660,879 entitled "Content Classification for Video Processing" filed Mar. 10, 2005, and Provisional Application No. 60/713,207 filed Aug. 30, 2005 entitled "Method and Apparatus for Error Recovery Using Intra-Slice Resynchronization Points" both of which are assigned to the assignee hereof and hereby expressly incorporated by reference herein.

BACKGROUND

1. Field

This invention relates to methods and apparatus for encoding and decoding digital data with error management schemes.

2. Background

The demands of higher data rates and higher quality of service in mobile communication systems are growing rapidly. However, factors such as limited transmit power, limited bandwidth and multi-path fading continue to restrict the data rates handled by practical systems. In multimedia communications, particularly in error-prone environments, error resilience of the transmitted media is critical in providing the desired quality of service because errors in even a single decoded value can lead to decoding artifacts propagating spatially and temporally. Various encoding measures have been used to minimize errors while maintaining a necessary data rate, however all of these techniques suffer from problems with errors arriving at the decoder side.

Hybrid coding standards, such as MPEG-1, MPEG-2, MPEG-4 (collectively referred to as MPEG-x), H.261, H.262, H.263, and H.264 (collectively referred to as H.26x), describe data processing and manipulation techniques (referred to herein as hybrid coding) that are well suited to the compression and delivery of video, audio and other information using fixed or variable length source coding techniques. In particular, the above-referenced standards, and other hybrid coding standards and techniques, compress, illustratively, video information using intra-frame entropy coding techniques (such as, for example, run-length coding, Huffman coding and the like) and inter-frame coding techniques (such as, for example, forward and backward predictive coding, motion compensation and the like). Specifically, in the case of video processing systems, hybrid video coding systems are characterized by prediction-based compression encoding of video frames with intra- and/or inter-frame motion compensation encoding.

Entropy coding enables very efficient lossless representations of symbols generated by random information sources. As such it is an indispensable component of both lossless and lossy data compression schemes. Despite its tremendous benefits to compression efficiency, entropy coding also complicates the decoding process. A common feature of all different approaches to entropy coding is that a single or a sequence of source symbols is associated and represented with a binary pattern, i.e., a sequence of ones and zeros known as a codeword, the length of which increases with decreasing symbol likelihood. Hence more likely symbols are assigned more compact representations, enabling on average a substantial savings over a straightforward symbol alphabet size based fixed-length representation.

The ambiguity around how many bits to consume for the next symbol in a bitstream, i.e. in an entropy coded representation of the output of an information source, is a complication for a decoder. However, much more importantly, in case of errors in the bitstream, the use of variable size codewords in conjunction with flipped bits (due to errors) may frequently result in the emulation of an incorrect codeword length and as a result the parsing/decoding process may lose its synchronization with the bitstream, i.e., correct identification of codeword boundaries and hence correct interpretation of the bitstream may start failing.

Assume a decoder implementing a basic level of error detection measures encounters a problem in decoding a bitstream and loses synchronization. Eventually, due to either a syntax violation, i.e., an invalid codeword, or a semantic failure e.g. invalid parameter values or unexpected bitstream object, the decoder may become aware of the problem and take necessary steps to resynchronize itself with the bitstream. This may induce data loss to an extent much beyond the corruption that triggered the data loss in the first place. The data loss can spread spatially across the frame due to spatial prediction that is used for digital compression. The data loss is also aggravated if the lost data are part of a reference frame for a motion compensated prediction region, causing temporal error propagation.

MPEG-x and H.26x hybrid coding standards typically provide resynchronization points (RSP) at NALU (Network Abstraction Layer Unit) boundaries, the most common NALU being a slice. A slice may be a group of consecutive macroblocks in raster scan order, where a macroblock is made up of 16×16 pixels. Pixels are defined by a luminance value (Y) and two chrominance values (Cr and Cb). In H.264, Y, Cr and Cb components are stored in a 4:2:0 format, where the Cr and Cb components are down-sampled by 2 in the X and the Y directions. Hence, each macroblock would consist of 256 Y components, 64 Cr components and 64 Cb components. H.264 generalized the concept of a slice through introducing slice groups and flexible macroblock ordering, (FMO). Slice groups and FMO allow slice and macroblock association to be totally arbitrary, providing flexibility much beyond the traditional structure of consecutive macroblocks. Slices start with an RSP known as a prefix code. The RSP prefix code is a byte-aligned, reserved bit string code word that is on the order of three bytes long. In order to serve as a true resynchronization point, all inter-coding prediction chains avoid referencing data prior to the RSP. The overhead induced by the prefix code bytes as well as the coding efficiency lost due to the interruption of or degradation in predictive coding chains, are the disadvantages of using slices frequently, i.e., using short slices, which are to be weighed against their advantages in supporting error resilience. Based on these concerns, the entire frame being encoded as a single slice is not uncommon as default encoder behavior. Another popular shorter slice structure is letting each macroblock row constitute a slice. Slices shorter than a macroblock row are far less frequently utilized and when they are adopted, most of the time the reason is to match the slice sizes (in number of bits) to a required transport packet size.

In the traditional slice based resynchronization scheme, if an error in the data are detected at a decoder, such as a semantic or syntactic error for example, the entire slice occurring after the error, is rendered useless. This is not a desirable condition, especially for longer slices such as an entire frame. What is needed is an intra-slice resynchronization point (IS-RSP) that may enable some of the video data contained in a corrupted slice to be salvaged. In addition, the IS-RSPs need to be positioned intelligently to maximize error resilience while reducing overhead.

SUMMARY

A method and apparatus for video coding comprises method and means for encoding resynchronization point information, wherein the resynchronization point information comprises information identifying a location of a resynchronization point within a section of a video bitstream, and information for decoding the bitstream following the resynchronization point; and transmitting the encoded resynchronization point information.

In another aspect, an apparatus for video coding comprises an encoder to encode resynchronization point information, wherein the resynchronization point information comprises information identifying a location of a resynchronization point within a section of a video bitstream, and information for decoding the bitstream following the resynchronization point; and a communicator configured to transmit the encoded resynchronization point information.

In the above aspects, the method and apparatus for video coding may further comprise method or means for calculating a rate distortion cost for a plurality of candidate positions; and selecting at least one of the candidate positions to be the location of the resynchronization point based on the calculated rate distortion cost. The method and apparatus for video coding may further comprise method or means for selecting the location of the resynchronization point within the section of the video bit stream, wherein the section is a member of the group consisting of a sub-macroblock, a macroblock, a slice, a frame, and a sequence of frames. The method and apparatus for video coding may further comprise method or means for selecting the location of the resynchronization point within the section of the video bitstream, wherein the resynchronization point is a start of a macroblock.

The information for decoding the bitstream may comprise information related to a neighboring section of video. The information for decoding the bitstream may comprise a member of the group consisting of a quantization parameter, a spatial prediction mode identifier and a number of non-zero coefficients. The information for decoding the bitstream may comprise information related to a context in which the bitstream following the resynchronization point.

The method and apparatus for video coding may further comprise method or means for encoding the resynchronization point information in a data message, wherein the data message is one of an in-band application message, a user specific private data message, a Supplemental Enhancement Information message, and an MPEG user_data message. The information for decoding the bitstream may comprise information related to a context in which the bitstream following the resynchronization point.

In another aspect, a method and apparatus for decoding comprising method or means for receiving an encoded bitstream comprising resynchronization point information, wherein the resynchronization point information comprises information identifying a location of a resynchronization point and information for decoding the bitstream following the resynchronization point; and decoding the received bitstream.

In a further aspect, an apparatus for decoding video comprises a receiver to receive an encoded bitstream comprising resynchronization point information, wherein the resynchronization point information comprises information identifying a location of a resynchronization point and information for decoding the bitstream following the resynchronization point; and a decoder to decode the received bitstream.

In the above, the method and apparatus for decoding may further comprise method or means for locating the resynchronization point in the bitstream based on the resynchronization point information. The information for decoding the bitstream may comprise information related to a context in which the bitstream following the resynchronization point is encoded. The method and apparatus for decoding may further comprise method or means for comparing a current context of the decoded bitstream with the received context information contained in the resynchronization point information; and discontinuing decoding the bitstream and restarting decoding the bitstream at the resynchronization point if the comparison shows that the current context and the received context information are not the same. The location of the resynchronization point may be within a section of video selected from a member of the group consisting of a sub-macroblock, a macroblock, a slice, a frame, and a sequence of frames. The location of the resynchronization point may be a start of a macroblock.

The information for decoding the bitstream may comprise information related to a neighboring section of video. The information for decoding the bitstream may comprise a member of the group consisting of a quantization parameter, a spatial prediction mode identifier and a number of non-zero coefficients.

The method and apparatus for decoding may further comprise method or means for receiving the resynchronization point information in a data message, wherein the data message is a member of the group consisting of an in-band application message, a user specific private data message, a Supplemental Enhancement Information message, and an MPEG user_data message. The method and apparatus for decoding may further comprise method or means for receiving the resynchronization point information that is encoded using a variable length code. The method and apparatus for decoding may further comprise method or means for detecting an error in the bitstream; discontinuing the decoding of the bitstream; and continuing decoding at the located resynchronization point.

In still another aspect, a method and apparatus for coding multimedia data comprises method or means for encoding a resynchronization point data; and inserting the resynchronization point data a slice of multimedia stream. The method and apparatus for coding may further comprise method or means for selecting a position of a resynchronization point within the slice; and wherein inserting comprises inserting the resynchronization point in the selected position. The method and means for selecting may comprises calculating a rate distortion cost for a plurality of candidate positions; and selecting at least one candidate position based on the rate distortion cost. The resynchronization point may comprise context information of the multimedia data.

In still a further aspect, a method and apparatus for processing multimedia stream comprises method or means for receiving a resynchronization point data in a slice of multimedia stream; and reconstructing multimedia data based on the resynchronization point data. The resynchronization point may comprise context information of the multimedia data.

In the above aspects, the method and/or apparatus may be implemented using a computer readable medium and/or a processor configured to carry out the method and functions of the apparatus.

DETAILED DESCRIPTION

Methods and apparatus that offer an improved resynchronization point within a section of a video bit stream, such as a slice, for example, are described. An encoder may provide resynchronization point information that includes information used to locate the resynchronization point, as well as information used to decode the bitstream following the resynchronization point. Since the resynchronization point is located within the section of the video bitstream, a decoder can resynchronize at the resynchronization point without sacrificing the remaining data in the section. Examples apply to multimedia data comprising video, audio or both video and audio data. In the following description, specific details are given to provide a thorough understanding of the embodiments. However, it would be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments.

It is also noted that the embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
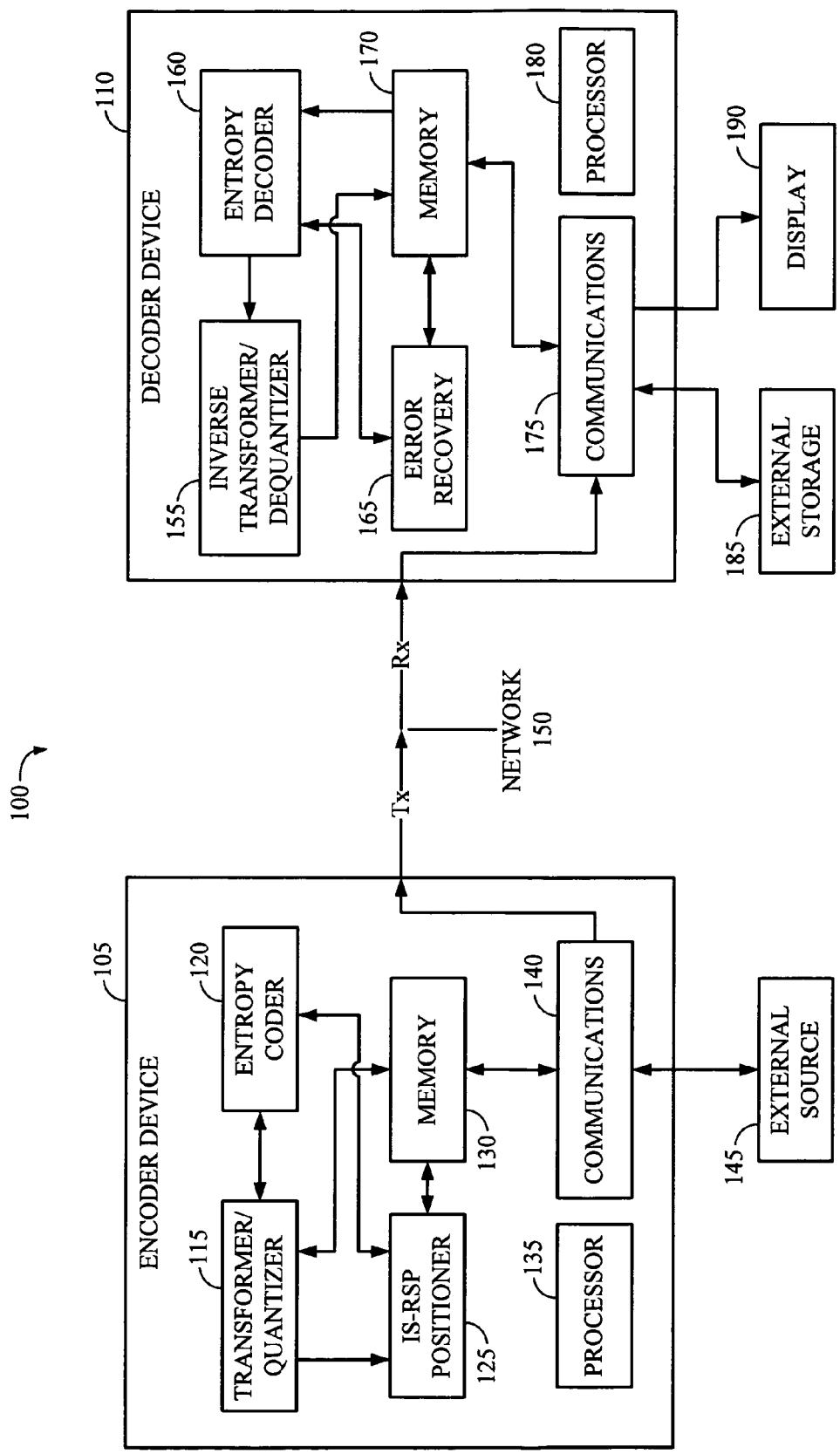
FIG. 1 is an illustration of an example of a communication system for delivery of streaming video.

FIG. 1 is an illustration of an example of a communication system for delivery of streaming video. The system 100 includes encoder device 105 and decoder device 110. Encoder device 105 further includes transformer/quantizer component 115, entropy encoder component 120, IS-RSP positioner component 125, memory component 130, processor component 135, and communications component 140. Processor 135 provides the computing platform to perform the processes of the other components. Transformer/quantizer component 115 transforms video data from the spatial domain to another domain, such as the frequency domain in the case of DCT (discrete cosine transform). The data that is being transformed can be intra-coded data where the actual video data are transformed, or it can be inter-coded data where a motion vector and residual error are transformed. Other digital transforms include the Hadamard transform, DWT (discrete wavelet transform), and integer transforms such as used in H.264.

Transformer/quantizer component 115 allocates the number of bits to represent each of the transformed coefficients. The quantization of the transformed coefficients can be changed for every macroblock. Entropy encoder component 120 encodes residual block data using a context-adaptive variable length coding (CAVLC) scheme and other variable-length coded units are coded using Exp-Golomb codes. Residual block data are the difference between the prediction and the original block pixel information being encoded. Above the slice layer, syntax elements are encoded as fixed- or variable-length binary codes. At the slice layer and below, elements are coded using variable-length codes (VLCs). The H.264 standard also supports Context-based Adaptive Binary Arithmetic Coding (CABAC) as an entropy coding scheme. The example methods discussed herein deal with the CAVLC entropy coding scheme, but similar methods could also be used with CABAC entropy coding. IS-RSP positioner component 125 performs calculations used for identifying a set of macroblock boundaries within a slice that can be used as IS-RSPs. In one scheme, a rate distortion cost optimization analysis is performed in searching for the best positions for IS-RSP's. Memory component 130 is used to store information such as raw video data to be encoded, encoded video data to be transmitted, or intermediate data being operated on by the various encoder components.

Communications component 140, e.g., a receiver, contains circuitry and/or logic used to receive data to be encoded from external source 145. External source 145 could be, for example, external memory, the Internet, a live video and/or audio feed, and receiving the data can include wired and/or wireless communications. Communications component 140 also contains circuitry and/or logic, e.g. a transmitter, to transmit (Tx) encoded data over Network 150. Network 150 can be part of a wired system such as telephone, cable, and fiber optic, or a wireless system. In the case of wireless communication systems, network 150 can comprise, for example, part of a code division multiple access (CDMA or CDMA2000) communication system or alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. One or more elements of encoder device 105 may be omitted, rearranged and/or combined. For example, processor component 135 may be external of encoder device 105.

Decoder device 110 contains similar components as encoder device 105 including inverse transformer/dequantizer component 155, entropy decoder component 160, error recovery component 165, memory component 170, communications component 175 and processor component 180. Decoder device 110 receives encoded data that has been transmitted over network 150 or from external storage 185. Communications component 175 contains circuitry and/or logic, e.g., a receiver, used for receiving (Rx) encoded data in conjunction with network 150, as well as logic for receiving encoded data from external storage 185. External storage 185 could be, for example, external RAM or ROM, or a remote server. Intra-coded data are first decoded by entropy decoding component 160. After entropy decoding, the data are dequantized and inverse transformed by inverse transform/dequantization component 155 resulting in a decoded picture that can be displayed on display component 190.

Inter-coded data may be decoded after the reference frame(s), from which it was predicted, is decoded. The data are decoded by entropy decoder component 160 resulting in quantized/transformed residual error coefficients. The residual error coefficients are dequantized and inverse transformed by inverse transformer/dequantizer component 155, resulting in a decoded residual error. The residual error is then combined with a best matching macroblock(s) from the reference frame(s), identified using the received motion vector information. The decoded frames can be displayed with display component 190, stored in external storage 185 or stored in internal memory of processor component 180. Display component 190 can be an integrated part of the decoding device that contains such parts as video display hardware and logic, including a display screen, or it can be an external peripheral device. Communications component 175 also contains logic used to communicate the decoded frames to external storage component 185 or display component 190.

Entropy decoder component 160 also contains logic for performing various syntactic and semantic checks. The syntactic and semantic checks are used to identify corrupt codewords that violate any of several rules. If a bitstream is determined to be corrupt, error recovery component 165 locates the next nearest non-corrupt IS-RSP in the bitstream in order to allow decoding to continue. Details of the processes performed by IS-RSP positioner component 125 and error recovery component 165 are discussed below. One or more elements of encoder device 110 may be omitted, rearranged and/or combined. For example, processor component 180 may be external of encoder device 105.

The introduction of context adaptive variable length coding (CAVLC) in H.264 complicates the resynchronization problem. In H.264, many symbols are encoded in a context, and the probability of each symbol varies with respect to the context in which it is coded, that is, what has been processed before a symbol. Because of this context dependency, not only would the loss of a symbol risk loss of synchronization, but loss of other data that determines the context that the symbol was encoded in, would also risk loss of synchronization. Therefore, in order to provide a resynchronization point (an IS-RSP) in a CAVLC bitstream, a decoder may need not only the location of where to look in the bitstream, but it may also need context information that subsequent symbols depend on.

Figure 2:
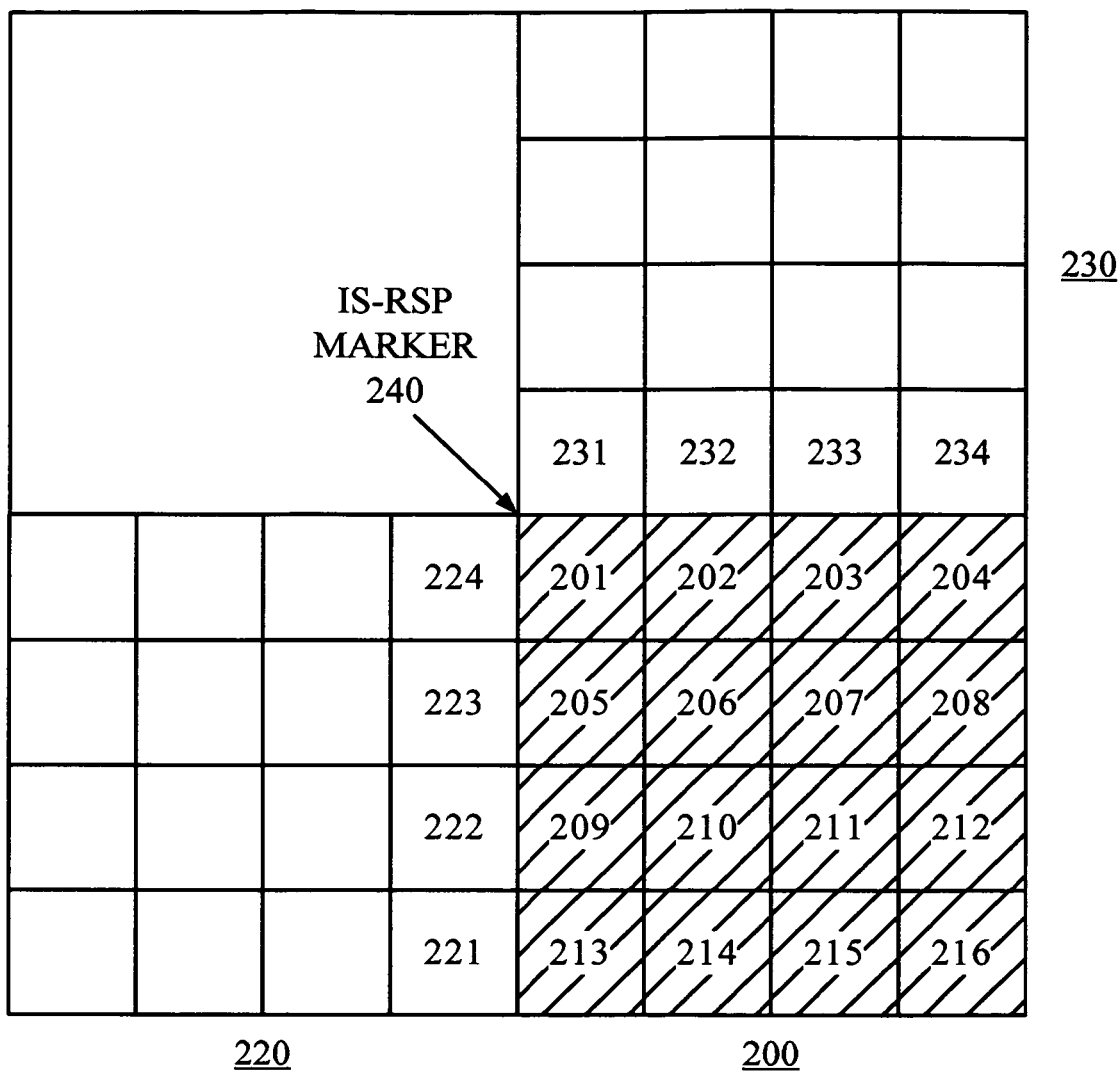
FIG. 2 depicts an example of a 16×16 pixel macroblock and neighboring 16×16 macroblocks.

An example showing what information is needed in an IS-RSP to enable resynchronization in an H.264 context adaptive bitstream will now be discussed. FIG. 2 depicts an example of a 16×16 pixel macroblock and neighboring 16×16 macroblocks. Macroblock 200 contains 16 4×4 pixel blocks 201 to 216. In this example, macroblock 200 is assumed to be an intra-coded macroblock. The context dependencies for intra-coded and inter-coded macroblocks are different. The context adaptive encoding for intra-coded macroblock 200 depends on parameters of neighboring macroblocks 220 and 230. The encoding and decoding of macroblock 200 depend on the number non-zero coefficients (Y, Cr and Cb coefficients) in the neighboring four 4×4 pixel blocks 221 to 224 and the neighboring four 4×4 pixel blocks 231 to 234. The encoding and decoding of macroblock 200 also depend on the quantization parameter value used to encode macroblock 220 and in some cases the intra prediction modes of blocks 221 to 224 and blocks 231 to 234. If, while decoding the CAVLC encoded symbols of block 200, the context parameters for macroblocks 220 or 230 are lost, then the decoder cannot proceed with further decoding and resynchronization is needed. In H.264, using NALU prefix codes for resynchronization, the rest of the slice containing macroblock 200 may be lost. However, if macroblock 200 is a resynchronization point, then decoding can proceed regardless of the state of macroblocks 220 and 230, because the IS-RSP contains the necessary context parameters about the neighboring blocks as discussed below.

A resynchronization point may be formed by encoding resynchronization point information that comprises information identifying a location of the resynchronization point within a section of a video bitstream, and encoding information used for decoding the bitstream following the resynchronization point.

For example, in order to make macroblock 200 a resynchronization point, an IS-RSP message can be encoded with information used by a decoder to locate IS-RSP marker 240 and hence locate macroblock 200. In order to provide a robust resynchronization point, the IS-RSP message may contain the neighboring MB information necessary for the decoder to decode macroblock 200 (i.e., dependency information needed to decode macroblock 200), as well as information related to the location of the macroblock within the frame and information related to the location of the macroblock within the bitstream.

As a example, in order for intra-coded macroblock 200 to be used as a resynchronization point in H.264, for example, the IS-RSP packet may contain the following H.264 specific parameters, A MB bit offset giving the location of the start of the IS-RSP macroblock within the bitstream.

A MB address offset or index identifying the spatial location of the IS-RSP macroblock.

The Number of non-zero coefficients for the 8 4×4 blocks on top of and to the left of the IS-RSP macroblock.

The intra prediction modes for the 8 4×4 blocks on top of and to the left of the IS-RSP macroblock. (If the IS-RSP points to a macroblock encoded in Intra 16×16 mode, this information could be omitted).

The quantization parameter (QP) value for the MB to the left of the IS-RSP macroblock.

where the last three items identify context adaptive parameters as discussed above.

Inter-coded macroblocks that are to be used as resynchronization points may have the same MB bit offset and MB address offset information, but may have different information relating to neighboring macroblocks or other context adaptive dependencies. Context adaptive parameters for inter coded MBs include the following information:

Neighboring MB modes (top and bottom macroblocks).
Number of non-zero coefficients in the neighboring 4×4 blocks.
Motion vectors and reference picture index for the neighboring 4×4 blocks.

In one example, the IS-RSP data may be sent in "user_data_unregistered" Supplemental Enhancement Information (SEI) messages, thereby maintaining the compliance of the H.264 bitstream. Although the example above is specific to the H.264 standard, the basic principles of IS-RSP can be readily applied to other hybrid video coding standards such as MPEG-x and H.26x. This is true, since the syntaxes of all these standards, in some way or other, provide provisions for carrying in-band application/user specific private data, such as the SEI message of H.264 or the user_data of MPEG-2. IS-RSP data could also be coded using compression coding techniques to improve coding efficiency. For example, if IS-RSPs are located near each other spatially in a frame, then the IS-RSP data could be coded using spatial prediction techniques to improve coding efficiency.

The intra-slice resynchronization point, or IS-RSP, can be extended to video sections other than slices. A slice, or a Group of Blocks as it is known in MPEG-x standards, is one of many partitioned sections in the H.264 or MPEG-x video sequence hierarchies. The H.264 hierarchy includes sequences made up of one or more pictures (or frames), where pictures are made up of one or more slices and where slices are made up of one or more macroblocks. Macroblocks may be further partitioned in to various sizes of sub-macroblocks. Resynchronization points may contain information enabling resynchronization on any level of partitioned video such as intra-sequence, intra-frame as well as intra-slice. For example, if slice header information is corrupted, then an RSP enabling resynchronization at the corrupt slice would need this slice header information and the RSP would effectively be an intra-frame RSP.

IS-RSPs need not be sent for every macroblock, as this would entail a tremendous amount of overhead data. An encoder device may use an algorithm such as the one described below for intelligently choosing where to position the IS-RSPs. The algorithm described below is an example of a method for keeping the overhead minimal while improving error resilience.

Resynchronization points may be generated by the encoding process and be made available to the decoding process to cope with channel impairments (as frequently as feasible based on a trade-off to be described). Also, resynchronization points can be uniquely identifiable in the bitstream. Furthermore, their structure may provide a decent level of immunity against emulation due to noise as well as against modification by noise to an extent disabling their reliable detection (in a statistical sense). Resynchronization points may serve to stop the propagation of predictive coding dependencies by initializing all predictors to appropriate default values that constrain future spatial and/or temporal predictions from referencing macroblocks prior to the IS-RSP.

Comprehensive and proper design of an encoder process for the identification of intra-slice resynchronization points may take into account 1) a channel model, 2) application specific bandwidth and quality (distortion) constraints, and 3) the content of the frame.

Content dependency may be desirable, depending on the application. In one possible application, the absence of intra-slice resynchronization points for a particular slice can be used to hint to the decoder that an appropriate (spatial or temporal) concealment algorithm known both to the decoder and encoder, may perform very satisfactorily in case of an error and consequent data loss in that slice.

Presented below is an example IS-RSP encoding scheme incorporating a form of content adaptability. This scheme may also serve to illustrate the general framework and the principles to be adopted by an encoder to identify the locations of resynchronization points.

Figure 3:
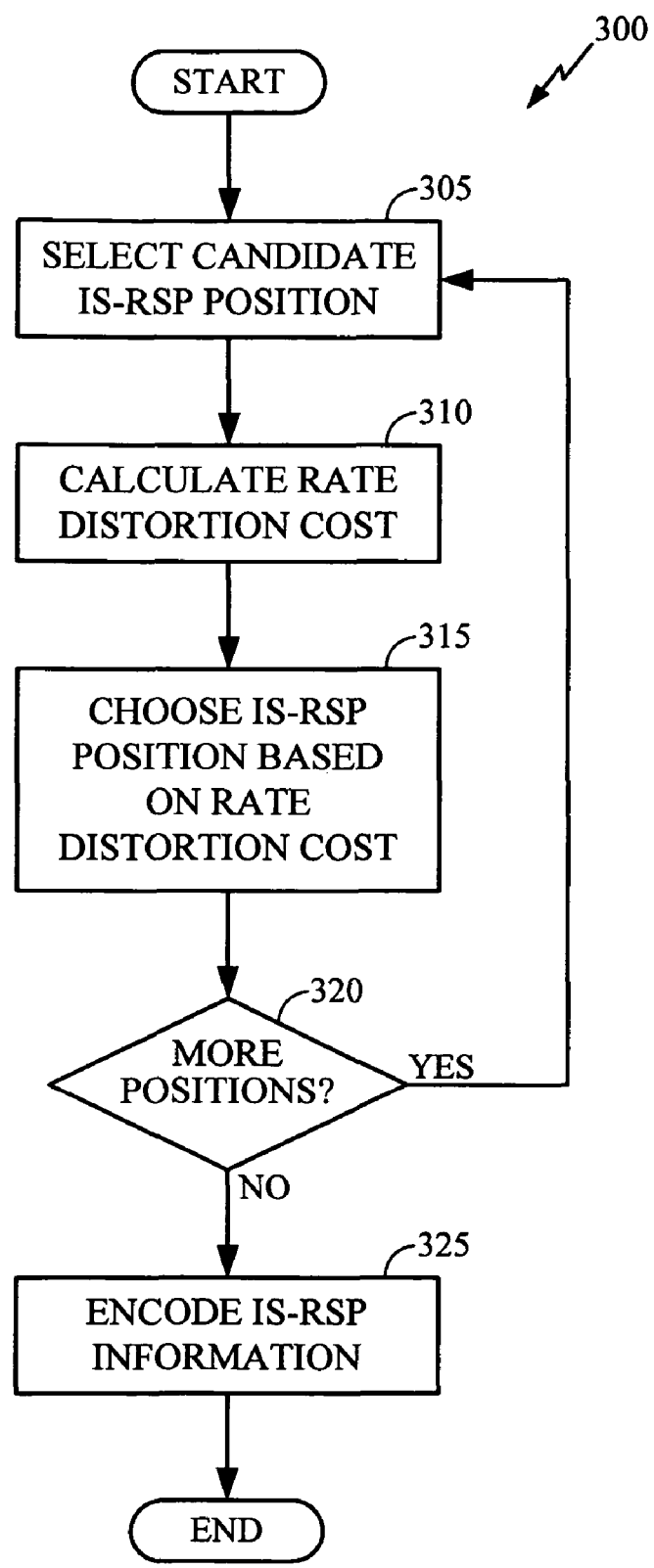
FIG. 3 illustrates an example of a process for encoding IS-RSPs.

FIG. 3 illustrates an example of an example process for encoding IS-RSPs. Process 300 includes an iterative loop for identifying an optimum, or near optimum, IS-RSP position out of a plurality of candidate positions. This allows the position of the IS-RSP to be variably or adaptively selected. This variability or adaptability offers benefits over a methodology where consecutive resynchronization points are positioned a fixed distance apart, e.g., there is a resynchronization point every 100 macroblocks. Encoding means such as IS-RSP positioning component 125 along with processor 135 in FIG. 1 can perform process 300. An encoder (or a selector) selects candidate positions for the IS-RSP at step 305. Details of methods of selecting the candidate positions for the IS-RSP's are discussed below. A measurement, such as rate distortion cost, for example, is calculated at step 310. The measurement used in step 310, such as the rate distortion cost discussed below, measures a tradeoff between the number of bits added due to the IS-RSP and the potential distortion caused by an expected error. Comparisons of rate distortion costs for the candidate positions are used for choosing 315 the IS-RSP position. The chosen position (based on the cost calculation 310) may be stored in memory. Decision block 320 tests if there are more candidate positions to be tested, repeating steps 305, 310 and 315 if more candidate positions exist and ending process 300 by encoding the IS-RSP information at step 325 if no more candidate exists. One or more elements of process 300 may be omitted, rearranged and/or combined.

Figure 4:
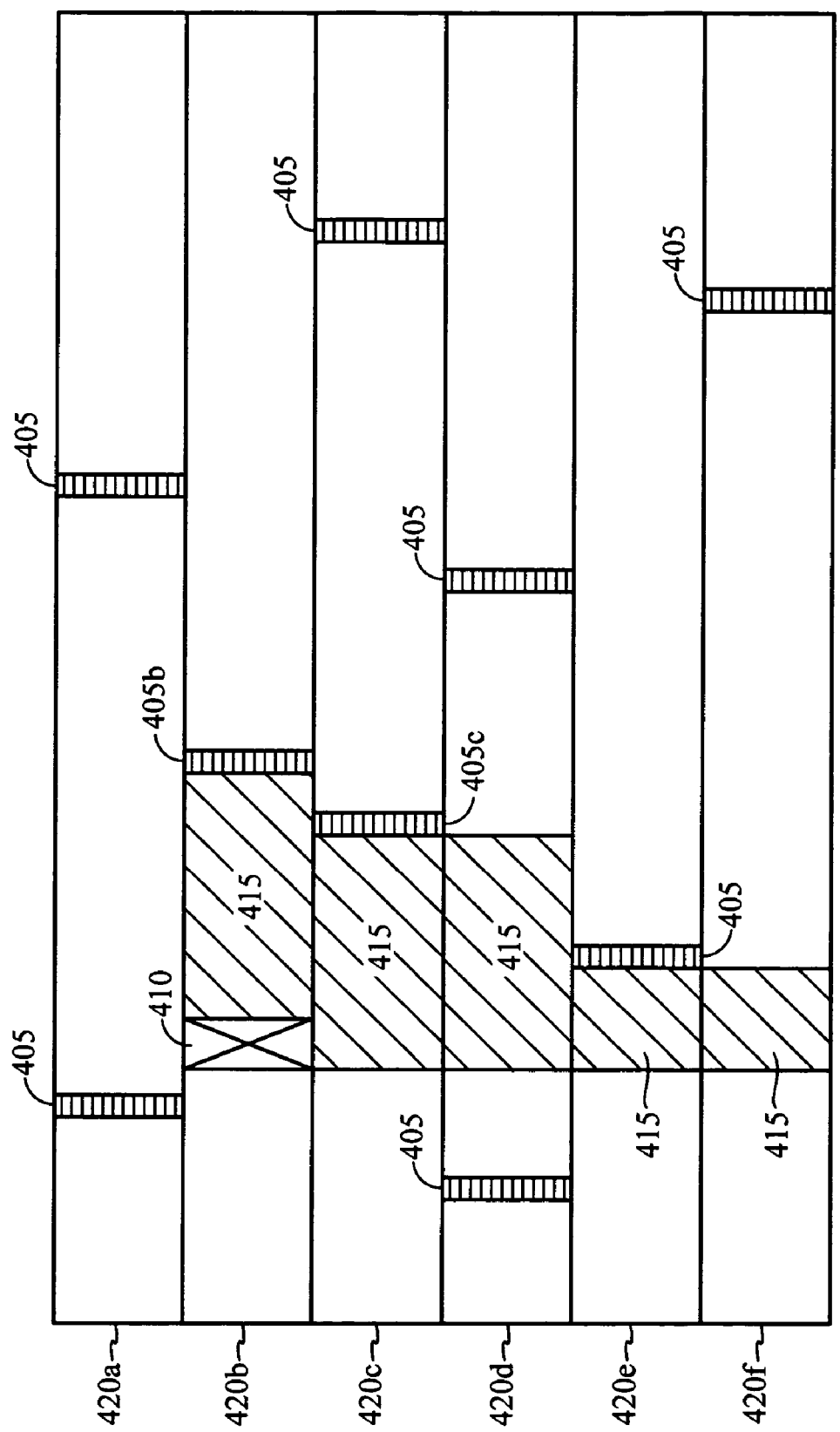
FIG. 4 depicts a video frame where error propagation is contained by utilizing IS-RSPs.

FIG. 4 depicts a video frame where error propagation is controlled by utilizing IS-RSPs. Frame 400 represents an intra-coded frame comprised of a single slice and six rows 420a-420f, wherein the rows 420a-420f are comprised of macroblocks (not shown). An encoding process such as that shown in FIG. 3 has positioned multiple IS-RSPs 405 within frame 400. As discussed above and depicted in FIG. 2, the decoding of each intra-coded macroblock depends on knowledge contained in the neighboring macroblocks to the left of and above the macroblock being decoded. If no IS-RSPs 405 were contained in frame 400, then an error 410 would propagate throughout the entire frame decoded after experiencing the error. Since the decoder would be forced to resynchronize at the next slice (the next NALU prefix code), this would result in the loss of most of second row 420b and all of rows 420c-420f. By positioning IS-RSPs 405 as shown, the error propagation is confined to areas 415 located to the left of and below IS-RSP 405b. After the resynchronization point, IS-RSP 405b, in row 420b, the rest of the row can be decoded. In row 420c, the macroblocks below the corrupted macroblocks cannot be reconstructed until the next resynchronization point, IS-RSP 405c, because of their dependency on the above neighboring macroblocks. Since IS-RSP 405c in row 420c is positioned left of IS-RSP 405b in row 420b, error 415 in row 420c is contained earlier. This is a much more desirable distortion condition than that offered by the slice resynchronization NALU.

Figure 5:
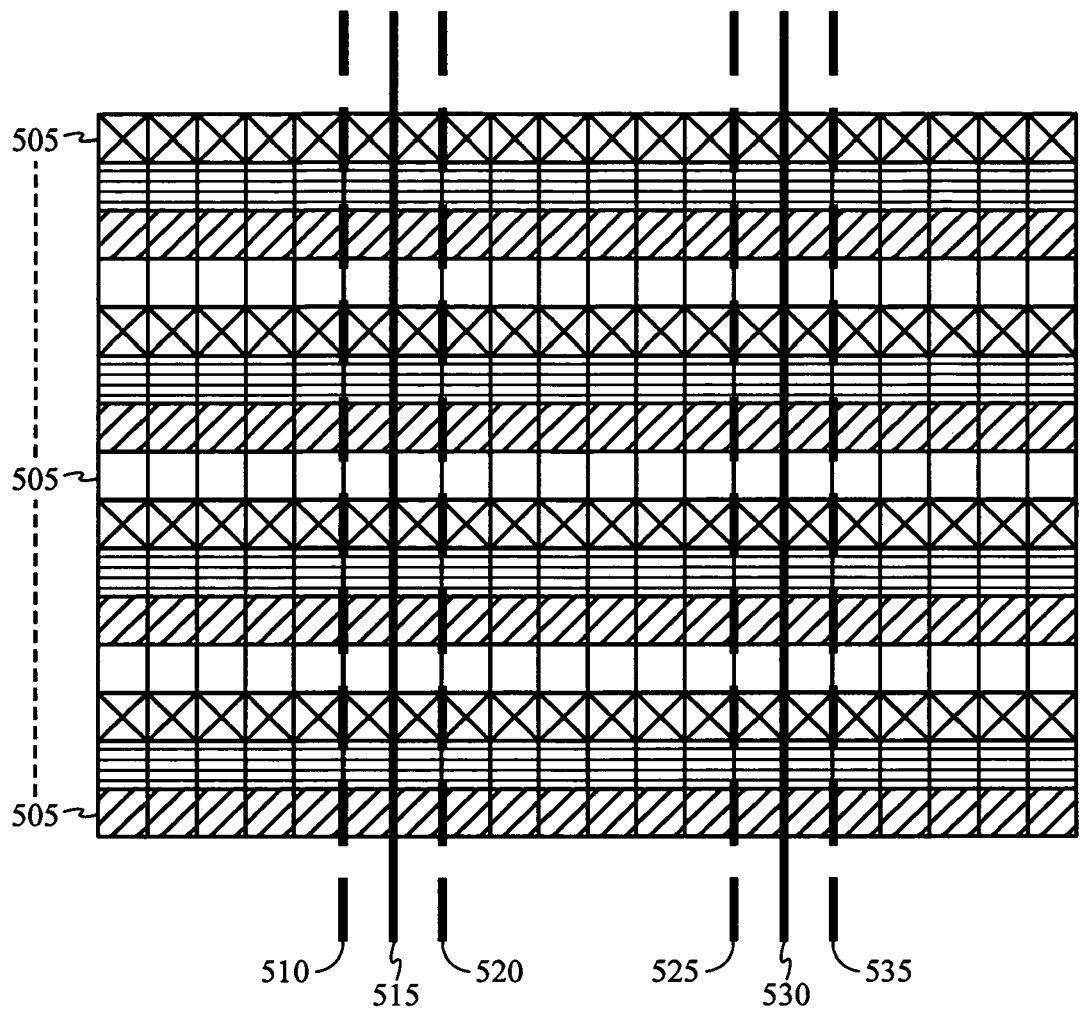
FIG. 5 is an example of an IS-RSP encoding scenario for identifying best candidate IS-RSP positions.

FIG. 5 is an example of an IS-RSP encoding method for identifying and candidate IS-RSP positions. Frame 500 is comprised of rows 505 wherein each row 505 constitutes a slice. In this example, the encoder is to provide two IS-RSPs per slice, each within a narrow region of macroblocks. A first region includes three macroblock positions 510, 515 and 520, and a second region includes three macroblock positions 525, 530 and 535. By positioning slices in centrally located portions of slices as shown, the error propagation may be reduces.

The rate distortion (R-D) optimization problem presented below may utilize the following nomenclature, quantities and notation. Assume a common (composite) form of the R-D cost function given by $$R + \lambda D \qquad [1]$$

as the quantity to be minimized in search of the good positions for IS-RSPs.

R and D respectively denote the rate (required number of bits to encode an IS-RSP) and the distortion (reconstruction error) associated with choosing a particular coding mode, and λ is the Lagrange multiplier describing the trade-off between rate and distortion to be stricken in a particular R-D optimization setting. Thus, the cost function evaluates the trade off of incurring additional cost of encoding a resynchronization point versus the savings of reduced distortion.

A standard R-D optimization that is performed in a hybrid video encoder is one that is employed for determining the macroblock coding mode. This is, in general, a vector quantity with multiple parameters assuming no constraints imposed by a resynchronization point. The solution to the encoder's standard R-D optimization formulation for the macroblock immediately to the right of position i, where i ∈ {510, 515, 520} or i ∈ {525, 530, 535}, yields $R_{S,i}$ and $D_{S,i}$ as the rate and the distortion respectively. Hence, the total cost, assuming no resynchronization point insertion and no data loss is given by:

$$R_{S,i} + \lambda D_{S,i} \qquad [2]$$

For an unreliable channel, formula 2 (assuming no data loss) is inadequate and has to be revised. Any adequate formulation has to account for the random channel behavior, and hence, the total cost may become an expected quantity (a probabilistic average) rather than a deterministic quantity as calculated in formula [2] above.

Figure 6:
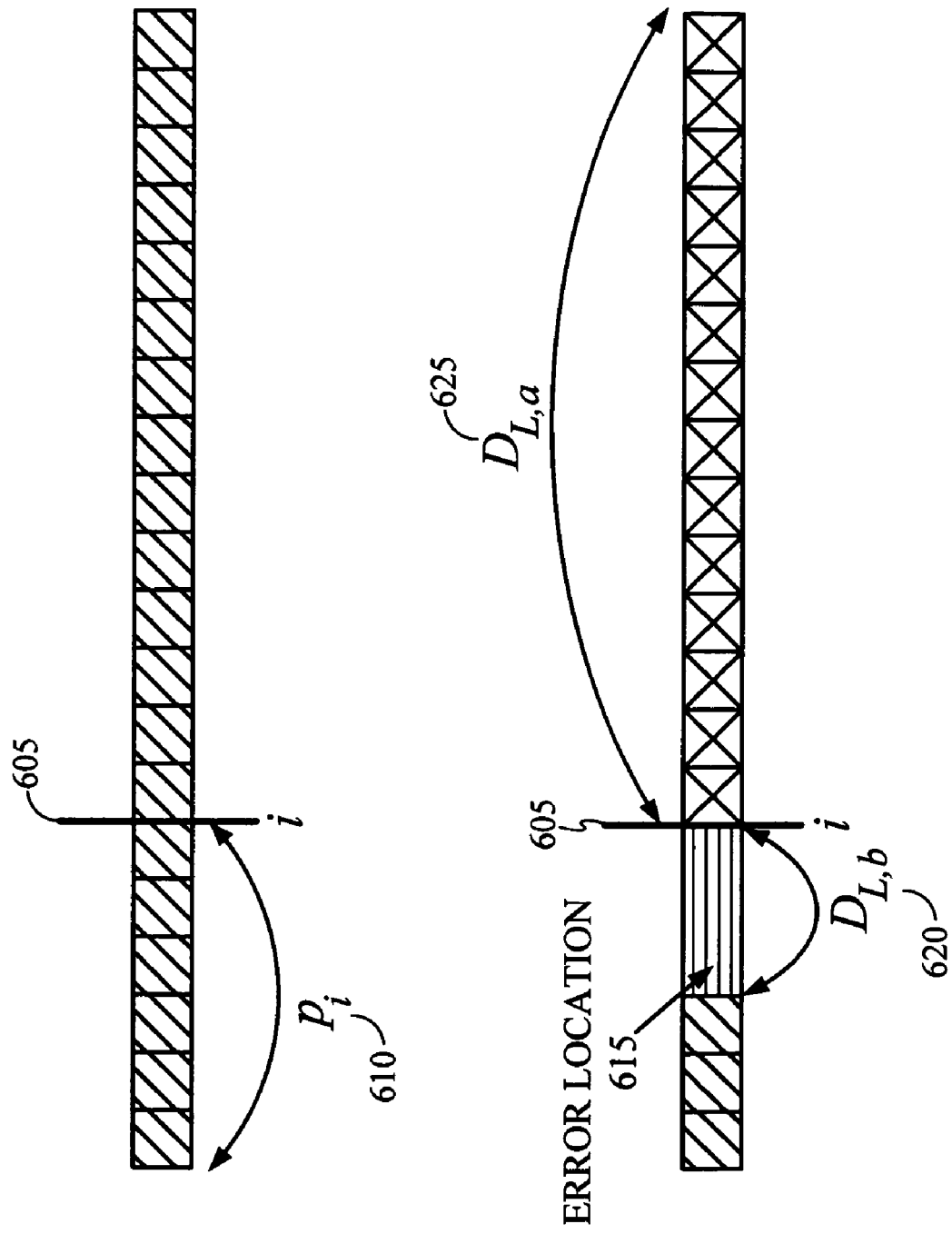
FIG. 6 depicts an example of error probabilities and associated distortions for use in a rate distortion analysis for identifying best candidate IS-RSP positions.

A more realistic loss-aware analysis may associate an expected cost, due to errors, while choosing the solution to the standard R-D optimization problem (i.e., no resynchronization point is inserted at position i but losses are possible). It is assumed that the probability of a slice being in error can be determined and is represented by $p_e$. It is also assumed that when a slice is in error, the corruption has occurred at a single point and over the extent of a few bits. These two assumptions can actually be made very accurate by using appropriate (data/symbol) interleaving techniques, particularly as in the case of digital wireless communications. As a last piece of simplification, it will be assumed that when a slice is in error, the exact error position within that slice is uniformly distributed with respect to macroblock units. A more accurate model could also have accounted for the size (in number of bits) of the coded representations of each macroblock in that slice. Under the above assumptions, the channel-aware expected total cost associated with no resynchronization point insertion can be revised as follows:

$$R_{S,i} + \lambda((1-p_e) \cdot D_{S,i} + p_e \cdot (p_i \cdot (D_{L,a} + D_{L,b}))) \qquad [3]$$

where the newly introduced parameters in formula [3] are depicted in FIG. 6. FIG. 6 depicts an example of error probabilities and associated distortions for use in a rate distortion analysis for identifying best candidate IS-RSP positions. Conditional probability $p_i$ (610) is the probability of having an error prior to location "i" (605) given that there is an error (where $p_e$ is the probability of having an error) in the slice. $D_{L,b}$ (620) is the distortion associated with slice data lost before a to-be-inserted candidate IS-RSP due to an error 615. $D_{L,a}$ is the distortion associated with slice data lost after the to-be-inserted candidate IS-RSP.

The possibility of the slice being corrupted subsequent to the candidate resynchronization point considered for location "i" (605), does not favor the insertion of this candidate resynchronization point since it would be of no help. Therefore, in order to avoid an unfair bias, there is no distortion contribution in formula [3] due to slice data losses resulting from possible errors occurring to the right of location "i" (605).

The presence of an intra-slice resynchronization point at location "i" (605), does not avoid slice data loss occurring between the error location (610) and location "i" (605). Therefore, in case of an error prior to the candidate resynchronization point, the distortion $D_{L,b}$ (620) that can result from the loss of this segment of slice data, is certain. Hence, $D_{L,b}$ (620) is included in the expected total cost function which is used to evaluate the alternatives of inserting a resynchronization point at "i" (605) or not.

The quantity $D_{L,a}$ (625) takes into account the distortion reducing influence of an appropriate spatial or temporal concealment algorithm available to a decoder. It is interesting and helpful to consider the two extreme cases of 'no concealment' and 'perfect concealment', which will be discussed below.

Desirably, the quantity $D_{L,a}$ (625) also reflects the distortion reducing influence of a subsequent IS-RSP in the same slice, if there is a priori information regarding its future use.

The next step is to calculate (using a rate distortion calculator component in one example) the expected 'channel-aware' R-D cost associated with actually inserting an IS-RSP at location "i" (605). The encoder, while processing a macroblock immediately after (i.e., to the right of) a resynchronization point, has to abide by coding constraints supporting the realization of a resynchronization as discussed above (e.g., initializing all predictors to appropriate default values). It is assumed that, under these constraints, the encoder has formulated and solved an R-D optimization problem of the following form, very similar to the standard R-D optimization problem discussed above:

$$(R_{R,i} + R_{O,i}) + \lambda D_{R,i} \qquad [4]$$

In formula [4], $R_{R,i}$ and $D_{R,i}$ are, respectively, the rate and distortion (reconstruction error) associated with the constrained coding mode chosen for the resynchronization point macroblock, and $R_{O,i}$ is the rate associated with the required overhead information to be included in the bitstream (e.g., the IS-RSP information contained in the SEI message). As discussed above, the R-D cost expression in formula [4] is not channel-aware, and can be modified as follows to introduce channel-awareness:

$$(R_{R,i} + R_{O,i}) + \lambda((1-p_e) \cdot D_{R,i} + p_e \cdot (p_i \cdot (D_{L,a} + D_{L,b}))) \qquad [5]$$

Since decoding can be restarted at location "i" (605), the distortion $D_{L,a}$ (625) can be set to zero. The resulting 'channel-aware' expected R-D cost associated with having a resynchronization point inserted at location "i" is given by:

$$(R_{R,i} + R_{O,i}) + \lambda((1-p_e) \cdot D_{R,i} + p_e \cdot (p_i \cdot D_{L,b})) \qquad [6]$$

Thus, the overall algorithm for identifying the good macroblock position for positioning an IS-RSP compares R-D costs given by formula [3] for the case with no IS-RSPs (see formula [7] below) with the R-D costs given by formula [6] for the case including IS-RSPs (see formula [8] below]. An encoder may calculate the following two quantities:

$$C_{No\_RSP,i} = R_{S,i} + \lambda((1-p_e) \cdot D_{S,i} + p_e \cdot (p_i \cdot (D_{L,a} + D_{L,b}))) \qquad [7]$$

$$C_{RSP,i} = (R_{R,i} + R_{O,i}) + \lambda((1-p_e) \cdot D_{R,i} + p_e \cdot (p_i \cdot D_{L,b})) \qquad [8]$$

Formulas [7] and [8] may be calculated for all candidate locations for IS-RSP positioning including ∀i ∈ (510, 515, 520) or ∀i ∈ (525, 530, 535) in FIG. 5. If in at least one of these candidate locations the inequality $C_{RSP,i} < C_{No\_RSP,i}$ is satisfied, then the encoder decides to insert an IS-RSP. If the inequality $C_{RSP,i} < C_{No\_RSP,i}$ is satisfied at more than one candidate location, then the encoder has to make a choice (as shown in step 315 of FIG. 3), which can be in favor of the location leading to the smallest value of $C_{RSP,i}$. This enables a level of content adaptivity, since the encoding constraints associated with resynchronization points may be of much less significance when the resynchronization point is aligned with appropriate image features, such as a vertical edge across which horizontal prediction from left neighbors already fails to provide satisfactory performance and is therefore not desirable. Under these circumstances, $R_{R,i}$ and $D_{R,i}$ may be very close in value to $R_{S,i}$ and $D_{S,i}$ respectively, reducing the R-D performance advantage of encoding with full flexibility, and widening the difference between $C_{RSP,i}$ and $C_{No\_RSP,i}$ due to the distortion component $(p_e \cdot p_i \cdot D_{L,a})$, thereby increasing the likelihood of IS-RSP insertion.

An interesting situation occurs if one considers an application and a matching encoder design reflecting considerable concern regarding distortions, that is to say, assume a value of $\lambda$ bounded away from zero. It is also assumed that the $p_e$ for the channel is not negligible. In an extreme case of 'no concealment' at the decoder, the distortion component $D_{L,a}$, representing total signal loss, may be very large, making the term $(p_e \cdot p_i \cdot D_{L,a})$ a dominating term, and resulting in $C_{No\_RSP,i}$ (given by formula [7]) greater than $C_{RSP,i}$ (given by formula [8]), and hence suggesting resynchronization point insertion. On the other extreme, assuming 'perfect concealment' (which can be well approximated by a successful concealment algorithm and suitable image content) all distortion components $(D_L^*)$, arising from slice data losses, may vanish leaving the following costs (from formulas [7] and [8], respectively):

$$C_{No\_RSP,i} = R_{S,i} + \lambda((1-p_e) \cdot D_{S,i}) \qquad [9]$$

$$C_{RSP,i} = (R_{R,i} + R_{O,i}) + \lambda((1-p_e) \cdot D_{R,i}) \qquad [10]$$

The additional rate $R_{O,i}$ that needs to be allocated for the overhead information to identify the IS_RSP, as well as the sub-optimal performance of encoding executed under constraints imposed by a resynchronization point, could lead to $C_{RSP,i} > C_{No\_RSP,i}$, implying avoiding the use of a resynchronization point. For other cases in between these two extremes, formulas [7] and [8] provide a simple but useful framework to utilize for positioning intra-slice resynchronization points.

Figure 7:
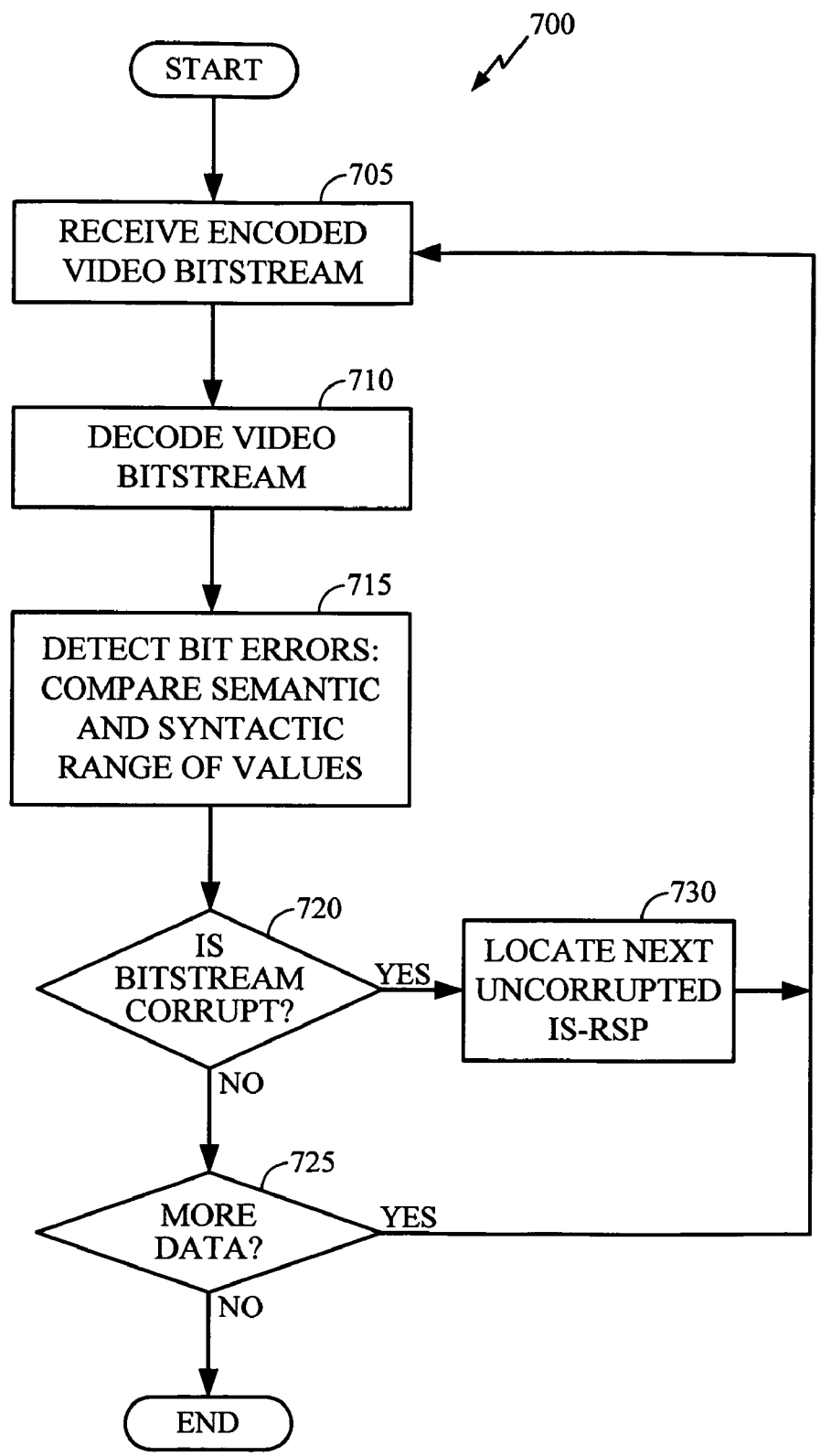
FIG. 7 is an illustration of one example of a decoder process utilizing an IS-RSP.

FIG. 7 is an illustration of one example of a decoder process utilizing an IS-RSP. Process 700 can be performed by a decoder means such as decoder device 110 in FIG. 1. The decoder device first receives an encoded video bit stream at step 705 that has been encoded with IS-RSPs in a manner as discussed in the examples above. Receiving means such as communications component 175 in FIG. 1 can perform act 705. The decoder device decodes the received video bitstream at step 710 using methods outlined in standards such as H.26x and MPEG-x that were used to encode the bitstream. Decoding means such as inverse transform/dequantization component 155 of FIG. 1 can perform act 710. The H.26x and MPEG-x standards also spell out semantic and syntactic guidelines that must be followed by standards compliant encoders and decoders. The decoder compares values of decoded variables with a range of values set by semantic and syntactic rules at step 715 in order to recognize if the bitstream has become corrupted. Comparing means such as entropy decoding component 160 and error recovery component 165 of FIG. 1 can perform the semantic and syntactic comparison checks of step 715. Semantic comparison checks include, but are not limited to, the following:

NAL Unit header byte syntax elements.
SPS (Sequence Parameter Set) syntax elements.
PPS (Picture Parameter Set) syntax elements.
Slice header syntax elements.
Slice level access unit descriptors.
Total number of macroblocks decoded.
Macroblock level syntax elements.
Availability flags (in a context dependent manner).
Insufficient data in the bitstream buffers to enable continuing decoding.
Externally supplied reference frame buffers (size and count) versus the current, i.e., active, SPS implications.

Syntactic comparison checks include decoding failures associated with decoding the CAVLC entropy codewords. If any semantic or syntactic rules are violated or an erroneous bit is detected in any other way, step 720 detects these failures and initiates resynchronization. If no rules are violated at step 720, step 725 checks if there is more data to be decoded. Decoding means such as error recovery component 165 of FIG. 1 performs the acts of steps 720 and 725. If more data exists, steps 705 through 725 (and possibly 730) are continued until no more data exists, and the process ends.

If an erroneous bit is detected, then resynchronization is performed. In order to resynchronize, the decoder locates the next uncorrupted IS-RSP in the bitstream at step 730 and restarts decoding, repeating steps 705 through 730 from the located next uncorrupted IS-RSP. Locating means such as error recovery component 165 of FIG. 1 performs the locating act of step 730. The decoder may have received IS-RSP information in the bitstream in step 705. The IS-RSP information could be, in one example, contained in an in-band application message or a user specific private data message, such as the SEI message of H.264 or the user_data message of MPEG-2. This message, contains information, as discussed above, related to the location of the IS-RSP macroblock within the video frame, as well as information related to the location of the IS-RSP within the bitstream. The message also contains data, as discussed above, necessary for the decoder to resume decoding, step 710 at the IS-RSP identified macroblock location. One or more elements of process 700 may be omitted, rearranged and/or combined.

Figure 8:
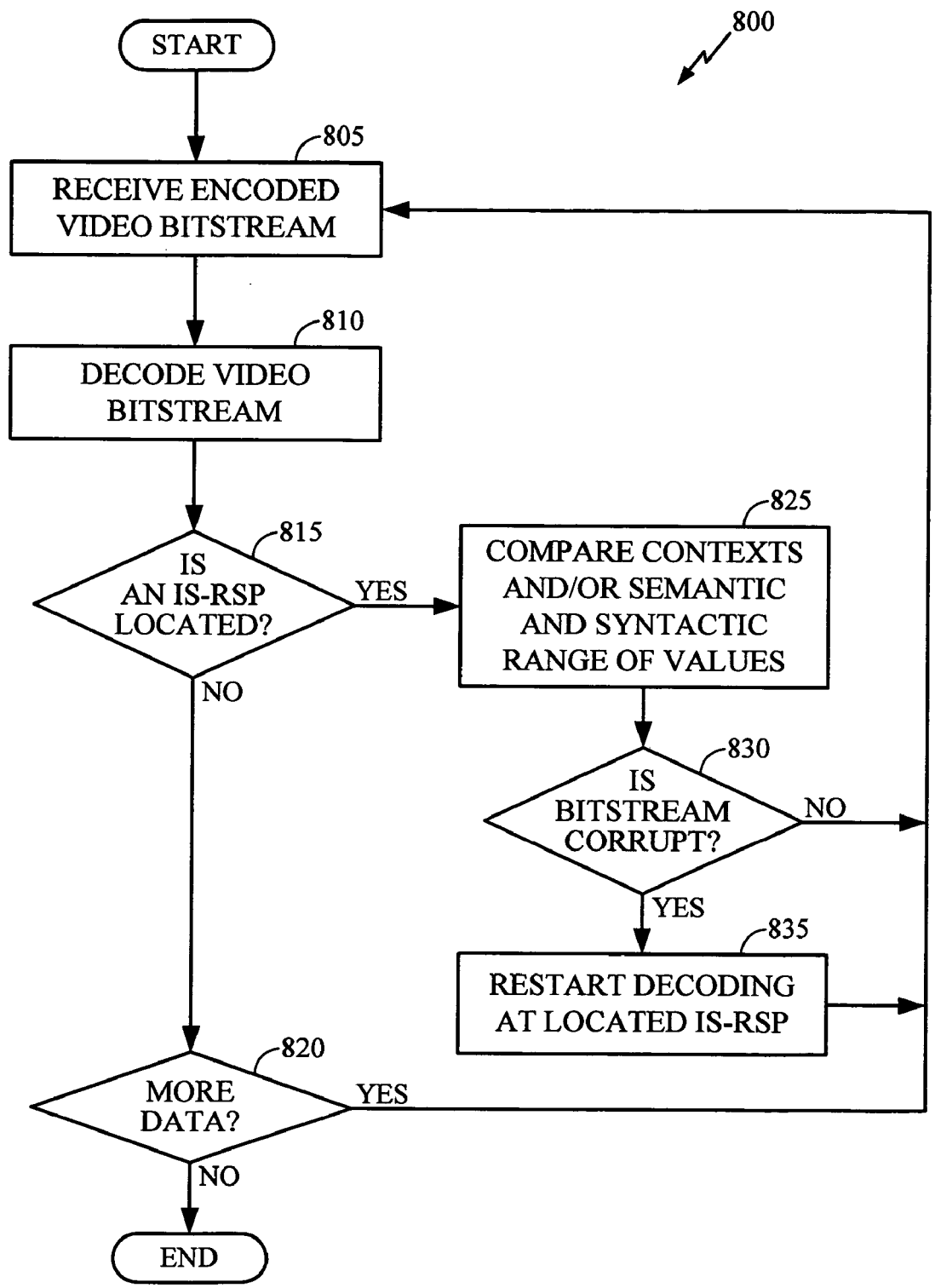
FIG. 8 is an illustration of another example of a decoder process utilizing an IS-RSP.

FIG. 8 is an illustration of another example of a decoder process utilizing an IS-RSP. Process 800 contains similar steps as process 700 of FIG. 7, but the IS-RSP is used in a way to identify a previously undetected corrupt bitstream as opposed to detecting the corruption in the bitstream and then locating the IS-RSP as shown in FIG. 7. Steps 805, 810 and 820 are similar to steps 705, 710 and 725 of FIG. 7, respectively. In the course of decoding the bitstream, the decoder may come upon a point that has been identified, in an IS-RSP information message, as an IS-RSP. When the decoder locates an IS-RSP in this way at step 815, it compares 825 the context of the current bitstream with the context information contained in the IS-RSP message. If the contexts do not agree then a comparison check (not shown) of the range of values set by the semantic and syntactic rules is performed for both the current data in the bitstream and the data contained in the IS-RSP. By comparing values of data contained in the current bitstream and data contained in the IS-RSP, with the range of values permitted by the semantic and syntactic rules, the decoder can determine if the current bitstream and/or the IS-RSP data are corrupted. If the bitstream is found to be corrupt, at step 830, the decoder may discontinue its current decoding and restart decoding at the IS-RSP it just located, at step 835, and continue on to step 805. If the IS-RSP, and not the bitstream, is determined to be corrupt, then the process continues at step 805. If both the bitstream and the IS-RSP are determined to be corrupt (not shown), then the next IS-RSP can be located and the process may be continued at 805. Further, if the context comparison between the current context and the context contained in the IS-RSP shows agreement, then no corruption is identified and the process continues at step 805. Comparing means such as entropy decoding component 160 and error recovery component 165 of FIG. 1 can perform the context and/or semantic and syntactic comparison checks of step 825. One or more elements of process 800 may be omitted, rearranged and/or combined.

The examples described above utilized the 16×16 pixel macroblock for the IS-RSP. As one of ordinary skill in the art would recognize, other block sizes could also be utilized for the IS-RSP methods discussed above.

Figure 9:
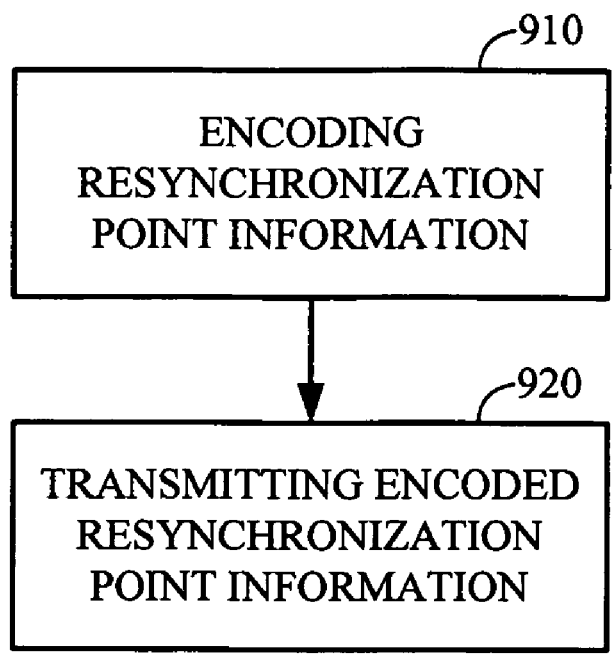
FIGS. 9-10 illustrate example method and apparatus for encoding IS-RSP.
Figure 10:
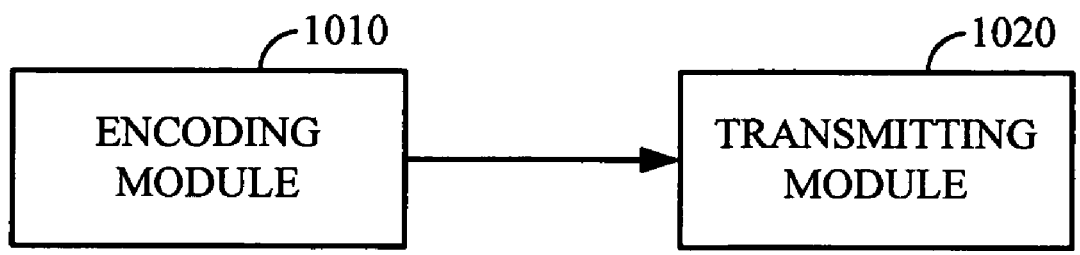

FIG. 9 illustrates one example method 900 for video coding. Method 900 comprises encoding 910 resynchronization point information, wherein the resynchronization point information comprises information identifying a location of a resynchronization point within a section of a video bitstream, and information for decoding the bitstream following the resynchronization point; and transmitting 920 the encoded resynchronization point information. FIG. 10 illustrates an example apparatus 1000 for video coding. Apparatus 1000 comprises an encoding module 1010 configure to encode resynchronization point information, wherein the resynchronization point information comprises information identifying a location of a resynchronization point within a section of a video bitstream, and information for decoding the bitstream following the resynchronization point; and transmitting module 1020 configured to transmit the encoded resynchronization point information.

Figure 11:
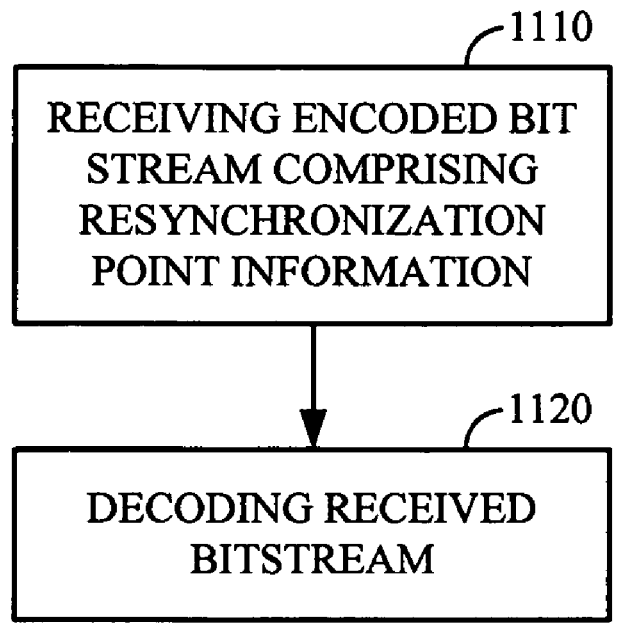
FIGS. 11-12 illustrate example method and apparatus for decoding.
Figure 12:
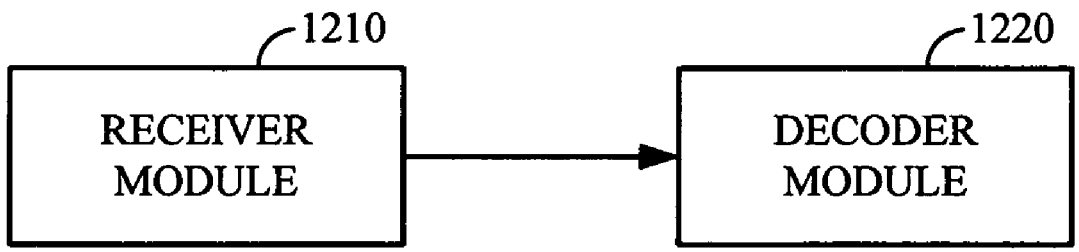

FIG. 11 illustrates one example method 1100 for decoding video data. Method 1100 comprises receiving 1110 an encoded bitstream comprising resynchronization point information, wherein the resynchronization point information comprises information identifying a location of a resynchronization point and information for decoding the bitstream following the resynchronization point; and decoding 1120 the received bitstream. FIG. 12 illustrates an example apparatus 1200 for decoding video. Apparatus 1200 comprises a receiver module 1210 configured to receive an encoded bitstream comprising resynchronization point information, wherein the resynchronization point information comprises information identifying a location of a resynchronization point and information for decoding the bitstream following the resynchronization point; and a decoding module configured to decode the received bitstream.

Figure 13:
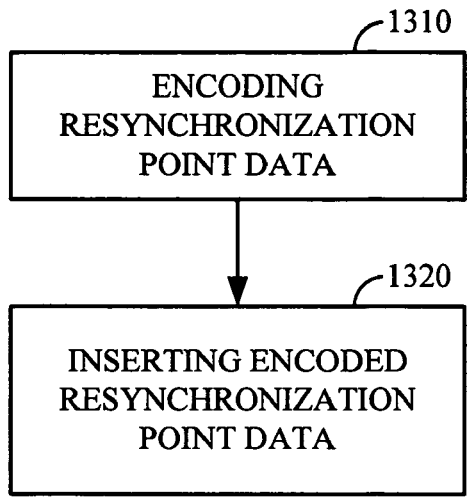
FIGS. 13-14 illustrate example method and apparatus for encoding IS-RSP.
Figure 14:
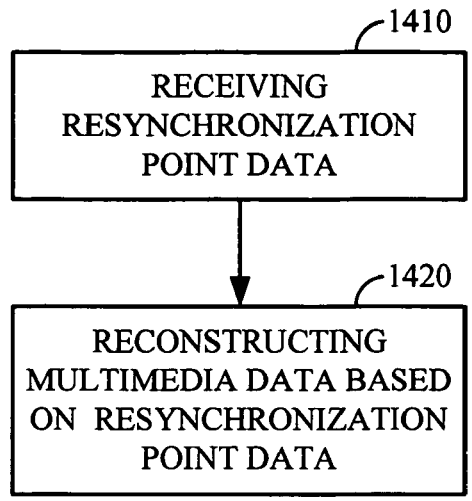

FIG. 13 illustrates an example method 1300 for coding multimedia data. Method 1300 comprises encoding 1310 a resynchronization point data; and inserting 1320 the resynchronization point data a slice of multimedia stream. The method may further comprise selecting a position of a resynchronization point within the slice; and wherein inserting comprises inserting the resynchronization point in the selected position. The selecting may comprise calculating a rate distortion cost for a plurality of candidate positions; and selecting at least one candidate position based on the rate distortion cost. FIG. 14 illustrates an example apparatus 1400 for implementing coding of multimedia data. The apparatus 1400 comprises an encoding module 1410 configured to encode a resynchronization point data; and an inserting module 1420 configured to insert the resynchronization point data a slice of multimedia stream.

Figure 15:
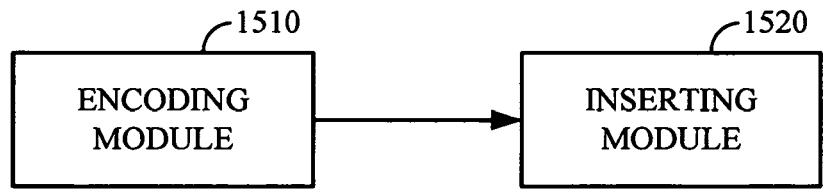
FIGS. 15-16 illustrate example method and apparatus for processing multimedia stream.
Figure 16:
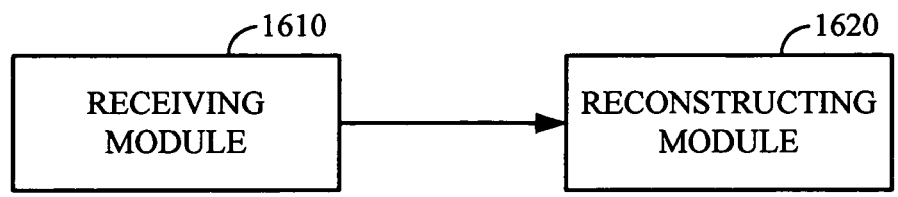

FIG. 15 illustrates an example method 1500 for processing multimedia stream. Method 1500 comprises receiving 1510 a resynchronization point data in a slice of multimedia stream; and reconstructing 1520 multimedia data based on the resynchronization point data. FIG. 16 illustrates an example apparatus 1600 for processing multimedia stream. Apparatus 1600 comprises a receiving module configured to receive a resynchronization point data in a slice of multimedia stream; and a reconstructing module configured to reconstruct multimedia data based on the resynchronization point data.

The examples described above used video only as an example. The methods and apparatus described above may also be utilized for other forms of streaming data including audio, graphics, images, text and combinations thereof.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

Thus, methods and apparatus to provide a resynchronization point within a section of a video bit stream that enables a decoder to locate the resynchronization point and decode the bitstream following the resynchronization point have been described.

What is claimed is:

1. A method of video coding, comprising:
encoding resynchronization point information, wherein the resynchronization point information comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
transmitting the encoded resynchronization point information.

2. The method of claim 1, further comprising:
calculating a rate distortion cost for a plurality of candidate positions, wherein the rate distortion cost measures, for each of the candidate positions, the tradeoff between the number of bits added due to the resynchronization point and the potential distortion caused by an expected error for the candidate position; and
selecting at least one of the candidate positions to be the location of the resynchronization point based on the calculated rate distortion cost.

3. The method of claim 1, further comprising selecting the location of the resynchronization point within the section of the video bit stream, wherein the section is a member of the group consisting of a sub-macroblock, a macroblock, a slice, a frame, and a sequence of frames.

4. The method of claim 1, further comprising selecting the location of the resynchronization point within the section of the video bitstream, wherein the resynchronization point is a start of a macroblock.

5. The method of claim 1, wherein the information for decoding the bitstream comprises information related to a neighboring section of video.

6. The method of claim 1, wherein the information for decoding the bitstream comprises a member of the group consisting of a quantization parameter, a spatial prediction mode identifier and a number of non-zero coefficients.

7. The method of claim 1, further comprising encoding the resynchronization point information in a data message, wherein the data message is one of an in-band application message, a user specific private data message, a Supplemental Enhancement Information message, and an MPEG user_data message.

8. The method of claim 1, wherein the information for decoding the bitstream comprises information related to a context in which the bitstream following the resynchronization point is encoded.

9. An apparatus for video coding, comprising:
means for encoding resynchronization point information, wherein the resynchronization point information comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
means for transmitting the encoded resynchronization point information.

10. The apparatus of claim 9, further comprising:
means for calculating a rate distortion cost for a plurality of candidate positions, wherein the rate distortion cost measures, for each of the candidate positions, the tradeoff between the number of bits added due to the resynchronization point and the potential distortion caused by an expected error for the candidate position; and
means for selecting at least one of the candidate positions to be the location of the resynchronization point based on the calculated rate distortion cost.

11. The apparatus of claim 9, further comprising means for selecting the location of the resynchronization point within the section of the video bit stream, wherein the section is a member of the group consisting of a sub-macroblock, a macroblock, a slice, a frame, and a sequence of frames.

12. The apparatus of claim 9, further comprising means for selecting the location of the resynchronization point within the section of the video bitstream, wherein the resynchronization point is a start of a macroblock.

13. The apparatus of claim 9, wherein the information for decoding the bitstream comprises information related to a neighboring section of video.

14. The apparatus of claim 9, wherein the information for decoding the bitstream comprises a member of the group consisting of a quantization parameter, a spatial prediction mode identifier and a number of non-zero coefficients.

15. The apparatus of claim 9, further comprising means for encoding the resynchronization point information in a data message, wherein the data message is one of an in-band application message, a user specific private data message, a Supplemental Enhancement Information message, and an MPEG user_data message.

16. The apparatus of claim 9, wherein the information for decoding the bitstream comprises information related to a context in which the bitstream following the resynchronization point is encoded.

17. An apparatus configured to perform a method for video coding, comprising:
a processor for encoding resynchronization point information, wherein the resynchronization point information comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
a transmitter for transmitting the encoded resynchronization point information.

18. The apparatus of claim 17, wherein the processor is further configured to perform:
calculating a rate distortion cost for a plurality of candidate positions, wherein the rate distortion cost measures, for each of the candidate positions, the tradeoff between the number of bits added due to the resynchronization point and the potential distortion caused by an expected error for the candidate position; and selecting at least one of the candidate positions to be the location of the resynchronization point based on the calculated rate distortion cost.

19. The apparatus of claim 17, wherein the processor is further configured to perform selecting the location of the resynchronization point within the section of the video bit stream, wherein the section is a member of the group consisting of a sub-macroblock, a macroblock, a slice, a frame, and a sequence of frames.

20. The apparatus of claim 17, wherein the processor is further configured to perform_selecting the location of the resynchronization point within the section of the video bitstream, wherein the resynchronization point is a start of a macroblock.

21. The apparatus of claim 17, wherein the information for decoding the bitstream comprises information related to a neighboring section of video.

22. The apparatus of claim 17, wherein the information for decoding the bitstream comprises a member of the group consisting of a quantization parameter, a spatial prediction mode identifier and a number of non-zero coefficients.

23. The apparatus of claim 17, wherein the processor is further configured to perform encoding the resynchronization point information in a data message, wherein the data message is one of an in-band application message, a user specific private data message, a Supplemental Enhancement Information message, and an MPEG user_data message.

24. The apparatus of claim 17, wherein the information for decoding the bitstream comprises information related to a context in which the bitstream following the resynchronization point is encoded.

25. An apparatus for video coding, comprising:
an encoder to encode resynchronization point information, wherein the resynchronization point information comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
a communicator configured to transmit the encoded resynchronization point information.

26. The apparatus of claim 25, further comprising a selector to select the location of the resynchronization point within the section of the video bit stream, wherein the section is a member of the group consisting of a sub-macroblock, a macroblock, a slice, a frame, and a sequence of frames.

27. The apparatus of claim 25, further comprising a selector to select the location of the resynchronization point within the section of the video bitstream, wherein the resynchronization point is a start of a macroblock.

28. The apparatus of claim 25, wherein the information for decoding the bitstream comprises information related to a neighboring section of video.

29. The apparatus of claim 25, wherein the information for decoding the bitstream comprises a member of the group consisting of a quantization parameter, a spatial prediction mode identifier and a number of non-zero coefficients.

30. The apparatus of claim 25, wherein the encoder encodes the resynchronization point information in a data message, wherein the data message is a member of the group consisting of an in-band application message, a user specific private data message, a Supplemental Enhancement Information message, and an MPEG user_data message.

31. The apparatus of claim 25, wherein the encoder encodes the resynchronization point information using variable length coding.

32. The apparatus of claim 25, further comprising:
a selector; and
a calculator to calculate a rate distortion cost for a plurality of candidate positions, wherein the rate distortion cost measures, for each of the candidate positions, the tradeoff between the number of bits added due to the resynchronization point and the potential distortion caused by an expected error for the candidate position; and
wherein the selector selects at least one of the candidate positions to be the location of the resynchronization point based on the calculated rate distortion cost.

33. A non-transitory computer readable medium embodying a method for video coding, the method comprising:
encoding resynchronization point information, wherein the resynchronization point information comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
transmitting the encoded resynchronization point information.

34. The non-transitory computer readable medium of claim 33, wherein the method further comprises:
calculating a rate distortion cost for a plurality of candidate positions, wherein the rate distortion cost measures, for each of the candidate positions, the tradeoff between the number of bits added due to the resynchronization point and the potential distortion caused by an expected error for the candidate position; and
selecting at least one of the candidate positions to be the location of the resynchronization point based on the calculated rate distortion cost.

35. The non-transitory computer readable medium of claim 33, wherein the method further comprises selecting the location of the resynchronization point within the section of the video bit stream, wherein the section is a member of the group consisting of a sub-macroblock, a macroblock, a slice, a frame, and a sequence of frames.

36. The non-transitory computer readable medium of claim 33, wherein the method further comprises selecting the location of the resynchronization point within the section of the video bitstream, wherein the resynchronization point is a start of a macroblock.

37. The non-transitory computer readable medium of claim 33, wherein the information for decoding the bitstream comprises information related to a neighboring section of video.

38. The non-transitory computer readable medium of claim 33, wherein the information for decoding the bitstream comprises a member of the group consisting of a quantization parameter, a spatial prediction mode identifier and a number of non-zero coefficients.

39. The non-transitory computer readable medium of claim 33, wherein the method further comprises encoding the resynchronization point information in a data message, wherein the data message is one of an in-band application message, a user specific private data message, a Supplemental Enhancement Information message, and an MPEG user_data message.

40. The non-transitory computer readable medium of claim 33, wherein the information for decoding the bitstream comprises information related to a context in which the bitstream following the resynchronization point is encoded.

41. An apparatus for coding multimedia data, comprising:
means for encoding a resynchronization point data, wherein the resynchronization point data comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
means for inserting the resynchronization point data into a slice of multimedia stream.

42. The apparatus of claim 41, further comprising:
means for selecting a position of a resynchronization point within the slice; and wherein inserting comprises:
means for inserting the resynchronization point in the selected position.

43. The apparatus of claim 42, wherein the means for selecting comprises:
means for calculating a rate distortion cost for a plurality of candidate positions, wherein the rate distortion cost measures, for each of the candidate positions, the tradeoff between the number of bits added due to the resynchronization point and the potential distortion caused by an expected error for the candidate position; and
means for selecting at least one candidate position based on the rate distortion cost.

44. The apparatus of claim 41, wherein the resynchronization point comprises context information of the multimedia data.

45. A method for processing multimedia stream, comprising:
receiving a resynchronization point data in a slice of multimedia stream, wherein the resynchronization point data comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
reconstructing multimedia data based on the resynchronization point data.

46. The method of claim 45, wherein the resynchronization point comprises context information of the multimedia data.

47. An apparatus for processing multimedia stream, comprising:
means for receiving a resynchronization point data in a slice of multimedia stream, wherein the resynchronization point data comprises information identifying a chosen location of a resynchronization point within a section of a video bitstream, the chosen location chosen by identifying an optimum or near optimum candidate position out of a plurality of selected candidate positions, based on a tradeoff between the number of bits added due to the resynchronization point and the potential distortion caused by an expected error for the candidate position; and information for decoding the bitstream following the resynchronization point; and
means for reconstructing multimedia data based on the resynchronization point data.

48. The apparatus of claim 47, wherein the resynchronization point comprises context information of the multimedia data.

* * * * *

UNITED STATES PATENT AND TRADEMARK OFFICE
CERTIFICATE OF CORRECTION

| | |
|---|---|
| PATENT NO. | : 7,929,776 B2 |
| APPLICATION NO. | : 11/373608 |
| DATED | : April 19, 2011 |
| INVENTOR(S) | : Sethi et al. |

Page 1 of 1

It is certified that error appears in the above-identified patent and that said Letters Patent is hereby corrected as shown below:

Column 19, line 11, claim 20: "perform_selecting" to read as --perform selecting--

Signed and Sealed this
Fifteenth Day of November, 2011

David J. Kappos
*Director of the United States Patent and Trademark Office*